US009759575B2

(12) United States Patent
Peer

(10) Patent No.: US 9,759,575 B2
(45) Date of Patent: Sep. 12, 2017

(54) METHOD FOR SUPPORTING A DRIVER DURING THE POSITIONING OF A MOTOR VEHICLE

(71) Applicant: AUDI AG, Ingolstadt (DE)

(72) Inventor: Reinhard Peer, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/258,636

(22) Filed: Sep. 7, 2016

(65) Prior Publication Data
US 2017/0067753 A1 Mar. 9, 2017

(30) Foreign Application Priority Data
Sep. 8, 2015 (DE) .......... 10 2015 011 710

(51) Int. Cl.
B60W 30/06 (2006.01)
B60W 50/08 (2012.01)
B60R 16/02 (2006.01)
G01C 21/36 (2006.01)
H04W 4/02 (2009.01)
G01C 21/34 (2006.01)

(52) U.S. Cl.
CPC .......... *G01C 21/3679* (2013.01); *H04W 4/02* (2013.01); *G01C 21/3469* (2013.01)

(58) Field of Classification Search
CPC ....... B60W 30/06; B60W 50/08; G01C 21/36; B60R 16/02
USPC ......................................................... 701/428
See application file for complete search history.

(56) References Cited

U.S. PATENT DOCUMENTS

| 8,933,663 | B2 | 1/2015 | Elias et al. | |
|---|---|---|---|---|
| 2011/0221387 | A1* | 9/2011 | Steigerwald | .......... B60L 11/182 320/108 |
| 2014/0097794 | A1 | 4/2014 | Elias et al. | |
| 2014/0111155 | A1* | 4/2014 | Bendicks | .............. B60L 11/182 320/108 |
| 2015/0291048 | A1* | 10/2015 | Ichikawa | .............. B60L 11/182 701/22 |
| 2015/0343916 | A1* | 12/2015 | Kim | .................... B60L 11/1835 701/22 |

(Continued)

FOREIGN PATENT DOCUMENTS

| DE | 10 2011 006 504 | 10/2012 |
|---|---|---|
| DE | 10 2011 109 834 | 2/2013 |

(Continued)

Primary Examiner — Yazan Soofi
(74) Attorney, Agent, or Firm — Henry M. Fejereisen LLC

(57) ABSTRACT

A method for supporting a driver during a positioning of a motor vehicle for charging an electrical energy storage of the motor vehicle, includes detecting a charging device for charging the energy storage of the motor vehicle in a vicinity of the motor vehicle; determining a position of the charging device relative to the motor vehicle; determining whether the charging device is located within an activation region that is defined in relation to the motor vehicle as a function of a distance of the charging device to a vehicle-fixed reference point and a direction in which the charging device is located relative to the reference point; and operating the display device in a positioning mode in which the display device displays information regarding the positioning of the motor vehicle relative to the charging device, when the charging device is located in the activation region.

7 Claims, 4 Drawing Sheets

(56) References Cited

U.S. PATENT DOCUMENTS

2016/0025821 A1* 1/2016 Widmer ............ G01R 33/0047
                                                        324/258
2016/0046194 A1* 2/2016 Tsukamoto ............ H02J 5/005
                                                        307/104
2016/0318414 A1* 11/2016 Ichikawa ............ B60L 11/1829

FOREIGN PATENT DOCUMENTS

| DE | 10 2013 016 880 | 7/2014 |
| WO | WO 2014/005621  | 1/2014 |
| WO | WO 2015/038650  | 3/2015 |

* cited by examiner

METHOD FOR SUPPORTING A DRIVER DURING THE POSITIONING OF A MOTOR VEHICLE

CROSS-REFERENCES TO RELATED APPLICATIONS

This application claims the priority of German Patent Application, Serial No. 10 2015 011 710.6, filed Sep. 8, 2015, pursuant to 35 U.S.C. 119(a)-(d), the disclosure of which is incorporated herein by reference.

BACKGROUND OF THE INVENTION

The invention relates to a method for supporting a driver during the positioning of a motor vehicle for charging an electric energy storage of the motor vehicle.

The following discussion of related art is provided to assist the reader in understanding the advantages of the invention, and is not to be construed as an admission that this related art is prior art to this invention.

The use of electrically driven motor vehicles can improve the energy balance of motor vehicles and reduce pollution. To promote acceptance of corresponding motor vehicles it is important to make charging of the energy storage of the motor vehicle as comfortable as possible. One way of making charging comfortable is to provide induction coils at parking lots, which make it possible to charge the vehicle while the vehicle is parked.

When using contactless charging devices, however, it is important for the efficiency of the corresponding charging process, that the motor vehicle is positioned as accurately as possible in a charging position. It is known to determine a position of the motor vehicle relative to the charging device by motor vehicle systems and to then guide the motor vehicle to the charging position either by automatic driving interventions or by corresponding driving instructions to the driver. One possibility to provide the driver with information relating to the positioning of the motor vehicle relative to the charging device is to display this information on a display device. The installation space for display devices however is limited. When using an available display device used for the mentioned function, a driver has to switch the display device into a corresponding mode, for example by using a menu system. This reduces the comfort during use of a charging device, which potentially lowers acceptance of electrically driven motor vehicles.

It would be desirable and advantageous to provide a method for supporting a driver during the positioning of a motor vehicle, which enables a comfortable provision of information relating to the positioning of the motor vehicle relative to the charging device to the driver.

SUMMARY OF THE INVENTION

According to one aspect of the present invention, a method for supporting a driver during a positioning of a motor vehicle for charging an electrical energy storage of the motor vehicle, includes detecting a charging device for charging the energy storage of the motor vehicle in a vicinity of the motor vehicle; determining a position of the charging device relative to the motor vehicle; determining whether the charging device is located within an activation region that is defined in relation to the motor vehicle as a function of a distance of the charging device to a vehicle-fixed reference point and a direction in which the charging device is located relative to the reference point; and operating the display device in a positioning mode in which the display device displays information regarding the positioning of the motor vehicle relative to the charging device, when the charging device is located in the activation region According to another advantageous feature of the invention, it is automatically determined whether the display device should be operated in the positioning mode. The determination whether the display device should be operated in the positioning mode and a control of the display for changing the display mode can be accomplished by a control device of the motor vehicle. When the display is not operated in the positioning mode, it can be deactivated in a further operating mode, i.e., no information is displayed. However, display modes can also be provided in which navigation data, multimedia contents, vehicle settings or the like are displayed.

According to another advantageous feature of the invention, the fact whether the charging device is located in the activation region depends on the distance of the charging device to a vehicle-fixed predetermined reference point and also on the direction in which the charging device is located relative to the reference point. This means that the activation region has an angle dependence and is not rotation symmetric. The analysis whether the charging device is located in the activation region may be conducted using polar coordinates. However, it is also possible to determine the position of the charging device relative to the reference point in Cartesian coordinates or in a different coordinate system and to determine the location of the charging device in the activation region by applying one or multiple rules to the respective determined coordinates of the charging device.

As an alternative the activation region can be defined in the form of a mask, which defines regions of the vicinity of the motor vehicle that are located in the activation region. A corresponding mask can for example be implemented in the form of a two-dimensional lookup-table, in which for each region information is stored whether the region is located within the activation region.

Because the location of the charging device in the activation region does not only depend on the distance, the display device is not always operated in the positioning mode when the motor vehicle is located in proximity to the charging device but only when it is likely, based on to the position of the charging device relative to the motor vehicle, that the driver of the motor vehicle intends to move the motor vehicle into a charging position for charging the energy storage.

In order to determine when the charging device is located in the activation region it is possible that a region of the charging device is defined, for example the surface of a charging plate, and the charging device is then defined to be already positioned in the activation region when a portion of this region is located in the activation region. As an alternative the charging device may also be defined as being located in the activation region only when the entire region is located within the activation region. It is also possible that a reference point on the charging device is defined and the charging device is defined as being located in the activation region when the reference point is located within the activation region. As a reference point in particular the center of a primary coil can be defined.

According to another advantageous feature of the invention, the predetermined vehicle-fixed reference point can in particular be defined so that it is located on a charging plate or a secondary coil of the vehicle, in particular in its respective center. However, other points on the motor vehicle can also be defined as reference points for example the center of a front axle or a rear axle.

According to another advantageous feature of the invention, the charging device and/or its position relative to the motor vehicle can be determined by means of a detection device of the vehicle. For example a transmitter can be provided on the charging device and the detection device can be a receiver, which receives the radio signal transmitted by the transmitter. By analyzing an amplitude, the runtime and/or a phase of the radio signal, the position of the charging device relative to the motor vehicle can be determined, in particular when multiple transmitters or multiple receivers are provided on the charging device for the motor vehicle. As an alternative or in addition the detection device can also be a sensor of the motor vehicle. For example the position of the charging device can be optically detected by a camera of the motor vehicle and the relative position can be determined by image processing. In addition numerous methods are known to the killed artisan to determine the position of a charging device relative to a motor vehicle by using one or multiple detection devices that can be used in the method according to the invention.

As an alternative or in addition it is possible to first determine an absolute position of a charging device. An absolute position of a charging device can be read out from a memory device in the motor vehicle, for example from a memory device that is assigned to a navigation device, or by external data sources, for example via radio communication. An absolute position of the motor vehicle can be determined by the position detection device of the motor vehicle, for example a satellite navigation system. From the absolute position of the charging device and the absolute position of the motor vehicle a relative position of the charging device can be determined. When the absolute position of the motor vehicle is detected multiple times an orientation of the motor vehicle can be determined from a movement direction and a steering angle of the motor vehicle and with this a direction in which the charging device is located relative to the motor vehicle.

According to another advantageous feature of the invention, the activation region can be defined by maximum distances and/or minimum distances to the reference point, that are dependent on the direction. The maximum distances may be greater in the direction of the vehicle front and/or the vehicle rear or in the driving direction of the motor vehicle during a forward and/or rearward drive than the maximum distance in a direction perpendicular to the mentioned directions, i.e., in the lateral region of the motor vehicle. This is based on the observation that a driver who intends to steer towards a charging device often maneuvers the vehicle so that the charging device is located in the front or the rear of the motor vehicle. When the driver however drives laterally past a charging device this usually indicates that the driver does not intend to steer towards a charging device.

According to another advantageous feature of the invention, the activation region can be predetermined so as to be mirror symmetrical relative to the vehicle longitudinal axis or relative to a mirror axis that extends in driving direction of the motor vehicle. When the motor vehicle is stationary an actual driving direction cannot be determined. In addition when the motor vehicle drives very slowly it is also possible that the driving direction of the motor vehicle changes. It is therefore possible that the activation region has two subregions, wherein a subregion of the activation region that extends toward the front of the vehicle is configured mirror symmetrical with regard to the driving direction of the vehicle during a forward drive and a subregion of the activation region that extends in the direction of the rear of the vehicle is configured mirror symmetrical with regard to a driving direction of the motor vehicle during a rearward drive. The subregions can overlap with each other.

According to another advantageous feature of the invention, the activation region can be predetermined in dependence on a driving direction of the motor vehicle. During a forward drive with a predetermined minimum speed an activation region can be used which extends from the reference point in the direction of the vehicle front. During a rearward drive with a predetermined minimum speed on the other hand an activation region can be used which extends from the reference point in the direction of the rear of the vehicle. When the vehicle moves with a low speed or when the vehicle is stationary, the activation regions for the forward drive and the rearward drive can be superimposed in order to define a common activation region.

According to another advantageous feature of the invention, the activation region for at least one of the subregions can be configured in the form of an angular segment, a triangle, or a trapezoid.

According to another advantageous feature of the invention, the activation region can be predetermined in dependence on at least one parameter that relates to the longitudinal and/or the transverse guiding of the motor vehicle. The parameter can be a steering angle and/or a driving direction and/or a vehicle speed. The activation region or a subregion of the actuation region can be rotated with the steering angle about the reference point or a different point that is fixed with regard to the vehicle. Hereby the rotation angle can be equal to the steering angle. However, it is also possible to provide a scaling between the steering angle and the rotation angle of the activation region or the subregion. Depending on the vehicle speed the activation region or subregion can be compressed or stretched in driving direction or in the direction of the longitudinal axis of the vehicle. When an activation region is defined by maximum distances and/or minimum distances that depend on the direction of the longitudinal axis of the vehicle, the maximum distances and/or the minimum distances can be increased with increasing vehicle speed and can be decreased with decreasing vehicle speed. The scaling of the minimum distances and/or the maximum distances with the vehicle speed can have arbitrary dependencies. A scaling can for example be stepped with the vehicle speed or the minimum distances and the maximum distances may only vary over a defined vehicle speed range and be constant outside of this range.

According to another advantageous feature of the invention, the display device is only operated in the positioning mode when the vehicle speed reaches or falls below a predetermined threshold value. When the motor vehicle drives with a very high speed it is not assumed that the driver intends to maneuver the motor vehicle into a charging position.

According to another aspect of the invention a motor vehicle, includes: a display device operable in plural display modes, wherein at least one of the plural display modes is a positioning mode in which the display device displays information regarding a positioning of the motor vehicle relative to a charging device for charging an energy storage of the motor vehicle; and a control device, wherein the control device is configured to detect a charging device for charging the energy storage of the motor vehicle in a vicinity of the motor vehicle; to determine a position of the charging device relative to the motor vehicle; determine whether the charging device is located within an activation region that is defined in relation to the motor vehicle as a function of a distance of the charging device to a vehicle-fixed reference point and a direction in which the charging device is located relative to the reference point; and to operate the display device in the positioning mode, when the charging device is located in the activation region.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
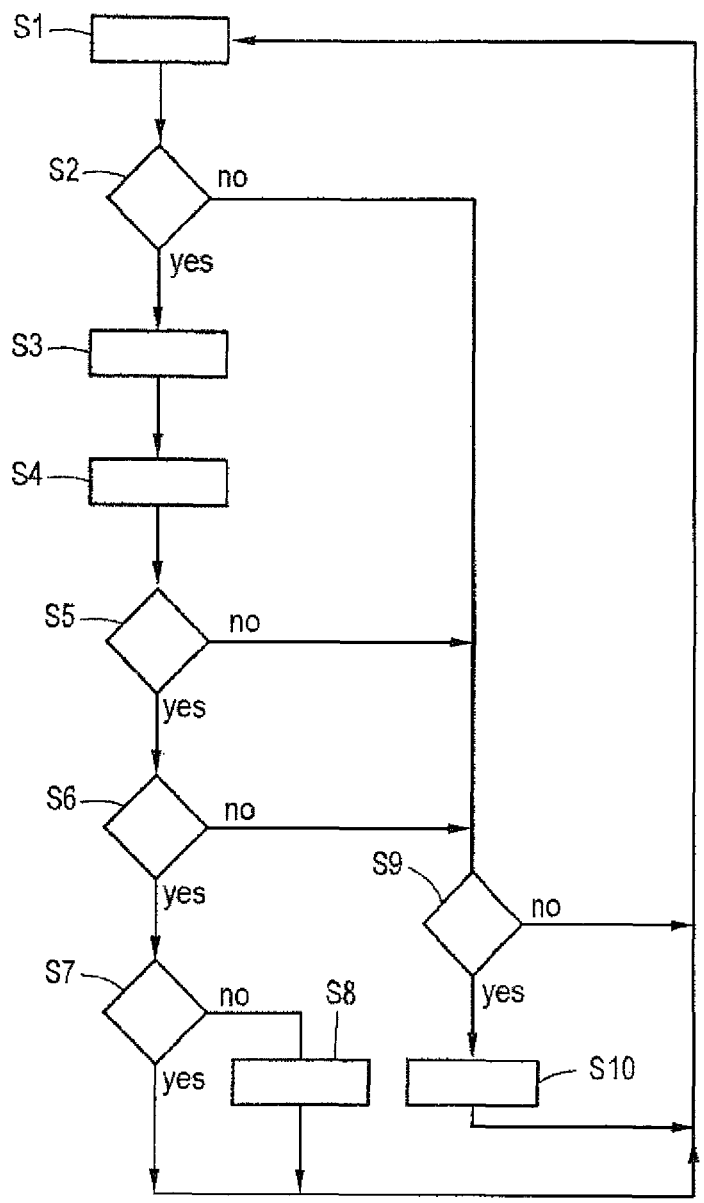
FIG. 1 shows a flowchart of an exemplary embodiment of the method according to the invention.

Throughout all the Figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

FIG. 1 shows a flowchart of an exemplary embodiment of a method for supporting the driver during the positioning of a motor vehicle 7 for charging an electrical energy storage. In the following the method is explained with reference to FIG. 2, which shows a motor vehicle 1, which has a display device 9 and a control device 8, wherein the control device 8 is configured for implementing the method shown in FIG. 1.

In order to charge an electrical energy storage 4 of the motor vehicle 1, a secondary coil 2 of the motor vehicle 1 is to be arranged above a charging device, for example a primary coil arranged in the ground, in order to inductively charge the energy storage 4 via a rectifier 3. In order to support the driver during the positioning, the display device 9 is to be operated in this case in a positioning mode, in which the display device 9 displays information relating to the positioning of the motor vehicle 1 relative to the charging device. The display device is to be operated in the positioning mode only when it is determined that the driver most likely intends to position the motor vehicle 1 relative to the charging device. When this is not the case the display device can be deactivated or can be used for different display purposes, for example for displaying navigation information, multimedia content or vehicle settings. The method steps S1 to S10 therefore serve for determining the intent of a driver and thus an expected future course of the drive and a corresponding control of the display device 9.

In step S1 charging devices are first detected that are located in the vicinity of the motor vehicle 1. This can be accomplished in that radio signals transmitted by a charging device are received by the antennas 5, 6 of the motor vehicle and are processed in the receiving device 7, wherein in particular a demodulation and digitalization is performed, whereupon the processing result is provided to the control device 8. In step S2 it is then tested whether at least one charging device is located in the vicinity of the motor vehicle.

Other approaches for detecting charging devices are also conceivable. For example in addition or as an alternative charging devices can be detected by sensors of the motor vehicle, in particular optically via cameras. It is also possible to use map data which indicate positions of charging devices and which are present in the motor vehicle 1, or for example are provided to the motor vehicle 1 via a communication connection. These positions can be compared with an own position of the motor vehicle, which can for example be determined by a satellite navigation system.

When it was determined in step S2 that at least one charging device is located in the vicinity of the motor vehicle, a position of the charging device relative to the motor vehicle 1 is determined in step S3. The determination of the relative position can be accomplished by way of polar coordinates, i.e., as distance and angle relative to the vehicle-fixed point or an vehicle-fixed axis. As an alternative a relative position can also be determined in Cartesian coordinates, wherein for example a position in driving direction and a position perpendicular to the driving direction is determined. Also any other coordinate systems can be used.

Figure 2:
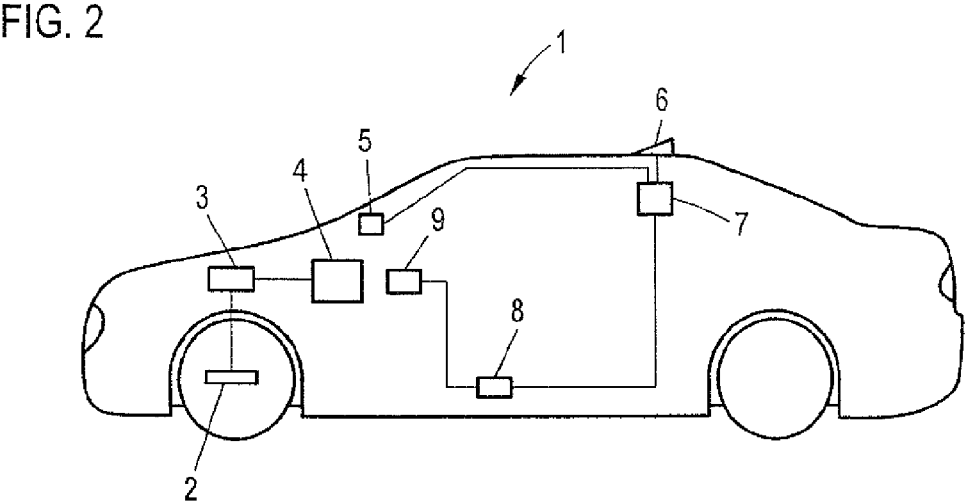
FIG. 2 shows an exemplary embodiment of the motor vehicle according to the invention.

When antennas 5, 6 such as in the motor vehicle 1 according to FIG. 2 are used to detect the charging device, the relative position can be detected by analyzing the received radio signals with regard to their runtime, their phase and/or their relative amplitude. Corresponding methods for radio triangulation of transmitters are known in the state-of-the-art and are therefore not described in detail.

When on the other hand charging devices are detected by one or multiple sensors of the motor vehicle 1 a relative position can for example be determined by analyzing sensor data for example by image recognition in the images of one or more cameras. When absolute positions of charging devices are known, for example from the aforementioned map data, the relative position of the respective charging device can be determined from the absolute position of the charging device and the absolute position of the motor vehicle 1. When a movement direction of the motor vehicle 1 is determined for example by multiply detecting the motor vehicle position, it can also additionally be determined using an absolute position of the charging device and an absolute position of the motor vehicle 1, in which direction relative to the motor vehicle 1 the charging device is located.

In step S4 an activation region that is fixed with regard to the motor vehicle is defined. The activation region describes a region of the vicinity of the motor vehicle, which is angle-dependent, i.e., not rotation symmetric. The display device 9 is to operated in the positioning mode only when a charging device is located in the activation region. The activation region preferably includes substantially those regions into which the secondary coil 2 of the motor vehicle 1 can be brought without changing the driving direction of motor vehicle 1.

The activation region can be defined in different ways, some of which will be explained in more detail with reference to FIGS. 3, 4 and 5. An activation region can be defined as a type of mask, which defines for each point in a defined region of the vicinity of the motor vehicle whether or not it is located within the activation region. It is also possible to define the activation region by assigning a maximum distance and optionally a minimum distance to angular segments in the vicinity of the motor vehicle, wherein the activation region for the respective angular segments respectively extends from the vehicle-fixed point or the minimum distance up to the maximum distance. The activation region can also be defined by predetermining one or multiple geometrical shapes that are scaled and/or rotated, in order to define the activation region. The activation region can be predetermined in dependence on at least one parameter that relates to the longitudinal and/or transverse guiding of the motor vehicle 1, i.e., for example in dependence on the steering angle and/or a vehicle speed.

In step S5 it is tested whether the charging device is located within the activation region, by defining a reference point on the charging device, for example the center point of a primary coil, and it is tested whether the reference point is positioned in the charging region. When the activation region is defined as a mask, the mask can be used as a look-up table, and it can thereby be tested whether or not the reference point is located within the activation region. When the activation region is defined by maximum distances and optionally minimum distances for angular segments, the angular segment is first determined in which the reference point is located and it is subsequently tested whether the distance to a predetermined vehicle-fixed point is smaller than the maximum distance and optionally greater than the minimum distance.

As an alternative it is also possible to determine a region that is defined as belonging to the charging device. For example the entire region of a charging plate that includes a primary coil can be defined as such a region. In this case a charging device can be defined as being already located in the activation region when a part of the region of the charging device is located within the activation region. However it is also possible to define a charging device as being located within the activation region only when the entire region of the charging device is located in the activation region.

When it was determined in step S5 that the charging device is located within the activation region, it is tested in step S6 whether the vehicle speed is smaller than a predetermined threshold value for the vehicle speed. When the motor vehicle 1 moves very fast, for example faster than 10 or 20 km/h, it can be assumed that the driver does not intend to position the vehicle 1 relative to a charging device.

When it is determined in step S6 that the vehicle speed is below the threshold value, it is first tested in step S7 whether the display device 9 is already operated in the positioning mode. When this is the case no change of the display mode is required and the method can be repeated from step S1. When this is not the case the display device 9 is controlled in step S8 by the control device 8 so that the display mode is automatically switched to the positioning mode. It is possible that a prior display mode of the display device, for example the display of navigation information, is stored in the control device 8 so that when it is determined that an operation in the positioning mode is no longer appropriate, it is changed back into the previous display mode.

In the positioning mode different items of information relating to the positioning of the motor vehicle relative to the charging device can be displayed depending on the concrete implementation of the motor vehicle or the method according to the invention. For example a position of the motor vehicle relative to the charging device can be displayed graphically. However it is also possible in addition or as an alternative to display driving instructions or target trajectories.

In the method according to FIG. 1 the display mode of the display device 9 is to be automatically switched when no positioning of the motor vehicle relative to the charging device is desired, so as to no longer operate the display device in the positioning mode. When it is determined in step S2 that no charging devices are located in the vicinity of the motor vehicle or it is determined in step S5 that all charging devices in the vicinity of a motor vehicle are located outside the activation region, or it is determined in step S6 that the vehicle speed is greater than a predetermined threshold value, it is then tested in step S9 whether the display device 9 is currently operated in the positioning mode. When this is not the case, no change of the display mode is required, whereupon the method can be repeated starting from step S1. However, when the display device 9 is operated in the positioning mode, the display mode is switched in step S10. When at the change into the positioning mode, as explained in step S8, a prior display mode of the display device 9 was stored, the display device 9 can be controlled so that the display device is operated again in the previously stored display mode. When this is not the case the display device can be operated in a predetermined standard mode or can be determined by the driver. Subsequently the method is repeated starting from step S1.

Figure 3:
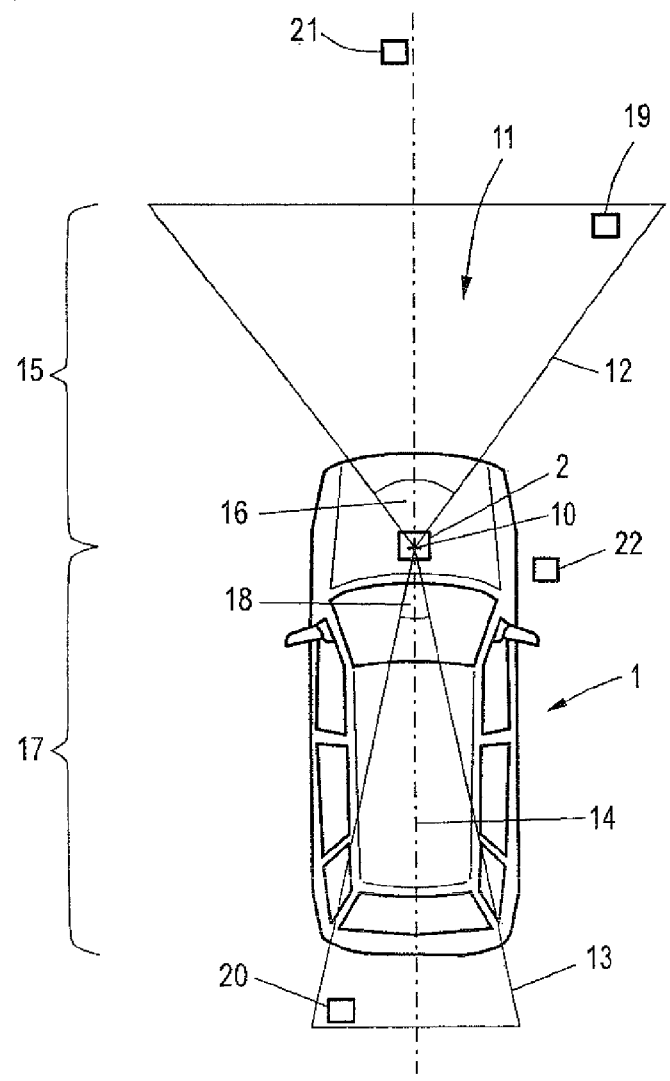
FIGS. 3 to 5 show respective exemplary embodiments of a method according to the invention in different driving situations.

FIG. 3 shows the use of an exemplary embodiment of a method for supporting a driver during the positioning of the motor vehicle 1. The method uses a fixedly predetermined activation region 11, which consists of two substantially triangular subregions 12, 13. The subregions 12, 13 approximately correspond to those regions into which a secondary coil 2 of the motor vehicle can be brought during a pure forward drive or during a pure rearward drive. It is possible that the subregions, 13 12, as shown in FIG. 3 are configured as triangles, however it is also possible that the individual legs of the subregions 12, 13 are concavely or convexly curved. In FIG. 3 both subregions 12, 13 are defined with reference to a common predetermined vehicle-fixed reference point 10. This serves for clearer representation. It can be advantageous to select these subregions 12, 13 so that the subregions overlap in the region of the secondary coil 2 in an overlap region.

The subregions 12, 13, and thus the entire activation region 11, are configured mirror symmetrical relative to the vehicle longitudinal axis 14. The subregion 12 covers a region that extends up to a defined distance 15 to the reference point 10 in a forward direction relative to the motor vehicle and has an opening angle 16. The subregion 13 extends up to a defined distance 17 to the reference point 10 in rearward direction of the motor vehicle 1 and has an opening angle 18. The opening angle 18 is selected smaller than the opening angle 16, in order to display the different driving possibilities of the motor vehicle 1 during a forward drive and a rearward drive.

The charging devices 19, 20 in the vicinity of the motor vehicle 1 are located within the activation region 11 of the motor vehicle, whereby, as explained in FIG. 1 a not shown display device of the motor vehicle 1 is potentially operated in a positioning mode. If the charging devices 19, 20 were not present in the vicinity of the motor vehicle, the display device would be operated in a different display mode. The charging device 21 is located far away from the motor vehicle 1 so that first no switching into the positioning mode is performed. However, when the motor vehicle 1 moves forward, the charging device 21 enters the activation region 11 which can then lead to a switching of the display device into the positioning mode can.

The charging device 22 is located laterally adjacent the motor vehicle 1. When the motor vehicle 1, as shown FIG. 3, is driven past the charging device 22 this indicates that the driver does not intend to position the motor vehicle relative to the charging device 22 for charging the energy storage. If a change of the display device into the positioning mode would be performed exclusively in dependence on a distance of the vehicle-fixed reference point 10 relative to the charging device 22 this would lead to the fact that when the motor vehicle 1 drives past the charging device 22 the display device would temporarily be operated in the positioning mode. If the motor vehicle 1 was for example driven past a plurality of parking lots, that all have charging devices, this could lead to a frequent change of the display mode, which would irritate the driver. It is therefore advantageous that the method according to the invention takes a direction in which the charging device 22 is located relative to the vehicle-fixed reference point 10 into account.

Figure 4:
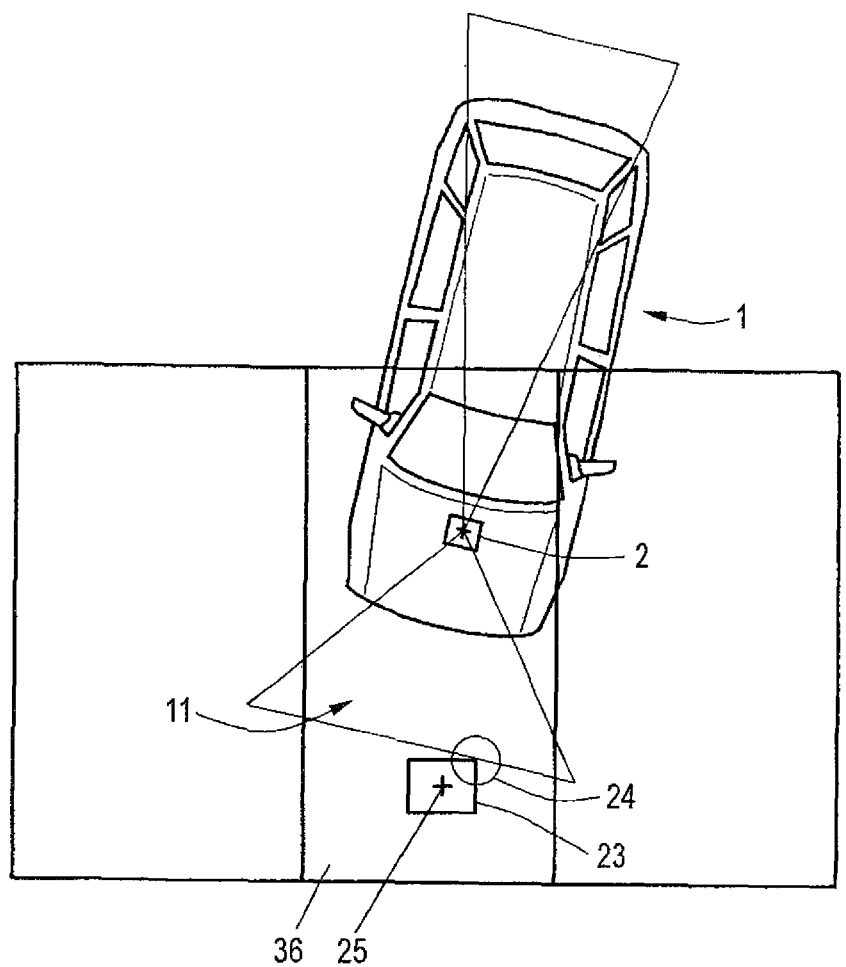

FIG. 4 shows the guiding of the motor vehicle 1 with the activation region 11 according to FIG. 3 into a parking lot 36, in which a charging device 23 is arranged. In the shown driving situation the activation region 11 and the region of the charging device 23 come to overlap at the position 24. When the condition for the position of the charging device 23 in the activation region 11 is defined so that already an overlap of the surface of the charging device 23 with the activation region 11 can lead to a change of the operating mode of the display device into the positioning mode, this change occurs in the shown driving situation. However, when the condition is defined so that the charging device 23 is defined as being located in the activation region 11 only when a reference point 25 or the entire surface of the charging device 23 is located in the activation region 11 a change into the positioning mode only occurs at a later time point, when the motor vehicle 1 for example has been guided into the parking lot 36.

Figure 5:
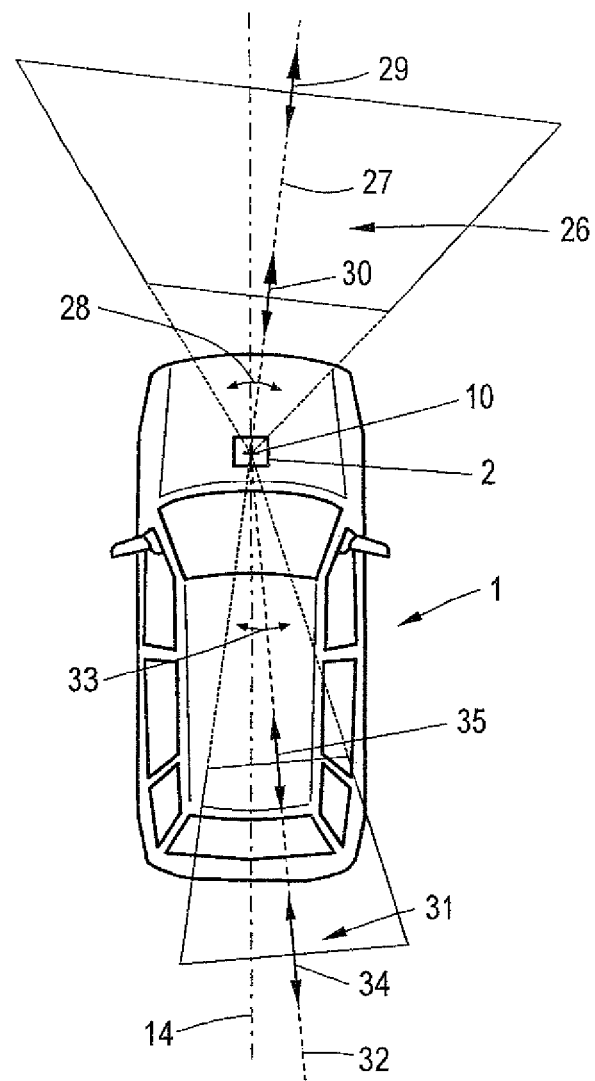

FIG. 5 shows an exemplary embodiment for predetermining an activation region 26, 31 in dependence on parameters that relate to the longitudinal and transverse guidance of the motor vehicle, i.e., in dependence on the steering angle, the driving direction and the vehicle speed. When the motor vehicle 1 is moved with a defined minimum speed it can be assumed that a positioning of the motor vehicle at a charging device is desired only with regard to those charging devices that are located in the driving direction. Depending on whether the motor vehicle 1 drives forward or backwards, it is thus possible to exclusively predetermine the activation region 26 that is located in front of the vehicle-fixed reference point 10, or to exclusively predetermine the activation region 31 located behind the vehicle-fixed reference point 10. When the motor vehicle 1 moves slowly and/or when the motor vehicle 1 is stationary both activation regions 36, 31 can be used.

For the determination of the activation regions 26, 31 a steering angle and with this an expected driving direction of the motor vehicle 1 is taken into account. The activation regions 26, 31 are therefore not selected to be symmetric regarding the vehicle longitudinal axis 14 but are symmetric to a mirror axis 27, 32 which extends in the driving direction during forward drive or in driving direction during rearward drive. The mirror axes 27, 32 are slanted relative to the longitudinal axis 14 of the vehicle by an angle 28, 33 relative to the vehicle-fixed reference point 10, wherein the angles 28, 33 correlate with the steering angle.

When the driver drives the motor vehicle 1 at high speed it can be assumed that he most likely drives the moor vehicle to a charging device that is situated far away from the motor vehicle. At low speeds of the motor vehicle on the other hand the driver most likely drives toward a charging device that is situated in the direct vicinity of the vehicle. Depending on the vehicle speed therefore an angle-dependent maximum distance and optionally an angle-dependent minimum distance can be adjusted. When triangular or trapezoid activation regions 26, 31 are used as shown in FIG. 5 the maximum distance can be adjusted by shifting the vehicle distal side of the respective activation region 26, 31 as indicated by the arrows 29, 34. Correspondingly a minimum distance can be adjusted by shifting the vehicle proximate side of the activation regions 26, 31 as indicated by the arrows 30, 35.

The activation regions 11, 26 and 31 shown in the Figures only serve as examples. Instead of the triangular or trapezoid shape of the activation regions 26, 31 or the subregions 12, 13 these regions can have waived borderlines. The activation regions 11, 26, 31 can also have additional not shown subregions. In particular at low speeds an additional subregion in addition to the activation regions 11, 26, 31 can be added which includes the direct vicinity of the vehicle-fixed reference point 10 or the secondary coil 2, in order to avoid abrupt changes of the display mode when fine-tuning the position of the motor vehicle relative to the charging device.

What is claimed as new and desired to be protected by Letters Patent is set forth in the appended claims and includes equivalents of the elements recited therein:

1. A method for supporting a driver during a positioning of a motor vehicle for charging an electrical energy storage of the motor vehicle, comprising:
   detecting a charging device for charging the energy storage of the motor vehicle in a vicinity of the motor vehicle;
   determining a position of the charging device relative to the motor vehicle;
   determining whether the charging device is located within an activation region by using polar coordinates that is defined in relation to the motor vehicle as a function of a distance of the charging device to a vehicle-fixed reference point and a direction in which the charging device is located relative to the reference point by using Cartesian coordinates;
   operating the display device in a positioning mode in which the display device displays information regarding the positioning of the motor vehicle relative to the charging device, when the charging device is located in the activation region; and
   operating the display device in a mode different from the positioning mode when the charging device is located outside the activation region.

2. The method of to claim 1, wherein the activation region is defined by at least one of maximum distances and minimum distances to the reference point, said minimum distances and said maximum distances being dependent on the direction in which the charging device is located relative to the reference point.

3. The method of claim 1, wherein the activation region is defined so as to extend mirror symmetrical relative to a longitudinal axis of the vehicle or relative to a mirror axis that extends in a driving direction of the motor vehicle.

4. The method of claim 1, wherein the activation region is predetermined as a function of at least one parameter that relates to at least one of a longitudinal guidance and a transverse guidance of the motor vehicle.

5. The method of claim 4, wherein the parameter is at least one of a steering angle, a driving direction and a vehicle speed.

6. The method of claim 1, wherein the display device is only operated in the positioning mode when the vehicle speed reaches or falls below a predetermined threshold speed.

7. A motor vehicle, comprising:
- a display device operable in plural display modes, wherein at least one of the plural display modes is a positioning mode in which the display device displays information regarding a positioning of the motor vehicle relative to a charging device for charging an energy storage of the motor vehicle; and
- a control device, said control device being configured
- to detect a charging device for charging the energy storage of the motor vehicle in a vicinity of the motor vehicle;
- to determine a position of the charging device relative to the motor vehicle;
- to determine whether the charging device is located within an activation region by using polar coordinates that is defined in relation to the motor vehicle as a function of a distance of the charging device to a vehicle-fixed reference point and a direction in which the charging device is located relative to the reference point by using Cartesian coordinates;
- to operate the display device in the positioning mode when the charging device is located in the activation region; and
- to operate the display device in a mode different from the positioning mode when the charging device is located outside the activation region.

* * * * *